US008084115B2

(12) United States Patent
Lanzi

(10) Patent No.: US 8,084,115 B2
(45) Date of Patent: Dec. 27, 2011

(54) REMOVABLE SHEATHING APPARATUS AND METHOD

(76) Inventor: Christopher H. Lanzi, Amsterdam, NY (US)

(*) Notice: Subject to any disclaimer, the term of this patent is extended or adjusted under 35 U.S.C. 154(b) by 0 days.

(21) Appl. No.: 11/946,233

(22) Filed: Nov. 28, 2007

(65) Prior Publication Data

US 2009/0136775 A1 May 28, 2009

(51) Int. Cl.
*B32B 9/00* (2006.01)

(52) U.S. Cl. ....... 428/99; 428/40.1; 428/41.7; 428/42.2; 428/68; 428/98

(58) Field of Classification Search .................... 428/98, 428/99, 40.1, 41.7, 42.2, 68; 52/727
See application file for complete search history.

(56) References Cited

U.S. PATENT DOCUMENTS

| | | | | |
|---|---|---|---|---|
| 1,096,580 | A | 5/1914 | Webb | |
| 1,401,626 | A | 12/1921 | Mader | |
| 3,486,262 | A | 12/1969 | Gregoire | |
| 3,906,129 | A * | 9/1975 | Damois | 428/99 |
| 3,928,930 | A | 12/1975 | Attwood | |
| 4,454,671 | A | 6/1984 | Morgenstern | |
| 4,730,488 | A | 3/1988 | David | |
| D303,099 | S | 8/1989 | Rolofson | |
| 5,359,810 | A | 11/1994 | Aul | |
| 5,365,685 | A | 11/1994 | Shank | |
| 5,383,296 | A | 1/1995 | Vecchione et al. | |
| 5,412,982 | A | 5/1995 | Potts | |
| 5,776,558 | A | 7/1998 | Wotton | |
| 5,869,159 | A | 2/1999 | Padilla | |
| 5,983,825 | A | 11/1999 | Nowak et al. | |
| 6,363,644 | B1 | 4/2002 | Frost | |
| 6,453,590 | B1 | 9/2002 | Burke | |
| D487,180 | S | 2/2004 | Lanzi | |
| 6,775,937 | B2 | 8/2004 | Ruana | |

* cited by examiner

*Primary Examiner* — Brent O'Hern
(74) *Attorney, Agent, or Firm* — Schmeiser, Olsen & Watts, LLP

(57) ABSTRACT

The present invention provides a removable sheathing apparatus comprising a covering member with a first edge and a second edge. The first edge is removably attached to the second edge by a connector. The apparatus also comprises a first shape retaining member which is attached to a third edge of the covering member. Further included is at least one support member movably extending away from the third edge of the covering member. Also provided is a corresponding method of sheathing a pole utilizing the removable sheathing apparatus.

13 Claims, 5 Drawing Sheets

REMOVABLE SHEATHING APPARATUS AND METHOD

BACKGROUND OF THE INVENTION

1. Technical Field

The present invention relates to a decorative pole, post, column cover, or wind sock and a method for decorating a pole, post or column.

2. Related Art

Providing decorative means for enhancing the appearance of a pole, post or column is often desirable in both the commercial and personal setting. For example, businesses today are under pressure to increase sales at an accelerating pace. Achieving success often depends on imaginative indoor and outdoor advertising. Eye-catching decorations can have a positive impact in increasing the awareness of a retail location, thereby increasing sales. In the personal context, decorations are often used to enhance the appearance of one's property. Additionally, people often enjoy publicizing the aspects of their individual identity that are important to them though patriotic, holiday or other decorations.

Thus, there is a need for a wrap-around decorative pole, post or column cover, and a method for decorating a pole, post, column or wind sock that is aesthetically pleasing, an efficient use of space, and easy to install and remove.

SUMMARY OF THE INVENTION

A first aspect of the present invention is a removable sheathing apparatus comprising: a covering member having a first edge and a second edge, wherein said first edge is removably attached to said second edge by a connector; a first shape retaining member, attached to a third edge of said covering member; and at least one support member movably extending away from the third edge of said covering member.

A second aspect of the present invention is a removable sheathing apparatus comprising: a covering member of a length, configured to a generally geometric shape; a first shape retaining member configured to associate to a first edge of said covering member; and at least one support member movably extending away from said first edge of said covering member.

A third aspect of the present invention is a method of sheathing a pole comprising: providing a pole; providing a removable sheathing apparatus including: a covering member, having a first edge, a second edge, and a third edge; a connector, configured to removably attach said first edge with said second edge; at least one support member, configured to attach to the third edge of said covering member; at least one securing member, configured to associate said at least one support member to said pole; and a first shape retaining member, configured to associate to the third edge of said covering member; surrounding said pole with the removable sheathing apparatus, such that the removable sheathing apparatus surrounds at least a portion of the pole; securing the removable sheathing apparatus to the pole with the at least one securing member; and attaching the first edge of said covering member to the second edge of said covering member with said connector.

BRIEF DESCRIPTION OF THE DRAWINGS

The present invention is described in detail below with reference to the drawings in which.

DETAILED DESCRIPTION OF THE INVENTION

Figure 1:
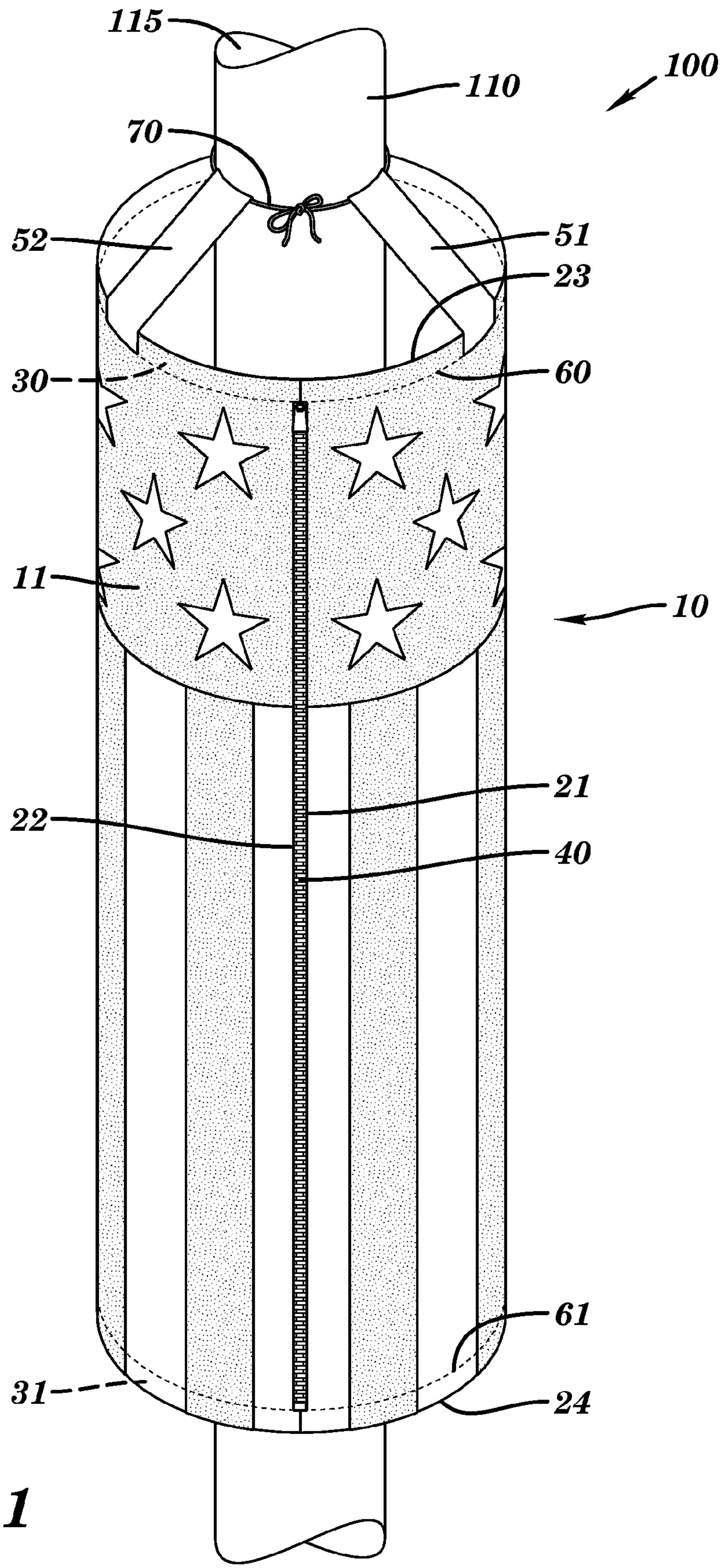
FIG. 1 shows a perspective view of one of the embodiments of the present invention in operation.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

Referring to FIG. 1, a removable sheathing apparatus 100 is shown having a covering member 10. A covering member 10 may have a first edge 21, a second edge 22, a third edge 23, and a fourth edge 24. A covering member 10 may be continuous or may have one or more openings there through. A covering member 10 may comprise a single member or a plurality of members. For example, a plurality of members may be several pieces of fabric, each of a different color, sewn together to form a covering member 10. A further example may be multiple sheets in an overlay or overlap. A covering member 10 may be made of fabric, nylon, plastic, polymer, metal, composite, paper, textile, cardboard, ceramic, or any other like material. A covering member 10 may have a display 11. A display 11 may be patriotic designs, holiday designs, advertisements, patterns, artwork, colorful prints, static images, dynamic images, movies, videos, electronic display, projection display, plasma display, liquid crystal display, or any other display or imaging device. A display may be of any size, shape, texture, or color, and may take up any portion of a covering member 10. The covering member may be used as a windsock in addition to a pole covering.

A first edge 21 may be removably attached to second edge 22 by connector 40 such that the covering member 10 has a perimeter of a first length. The perimeter dimension of the covering member 10 is shown more particularly on the embodiment depicted in FIG. 5, as the dashed line 312. A connector 40 may be a zipper, buttons, an adhesive, tie-cords, or any other attachment means. A removable sheathing apparatus may be removably attached to a pole 110. Pole 110 may be a column, post, tree, planting stand, table leg, flag pole, tent pole, gazebo member or anything with a length and a perimeter or circumference that may accommodate a sheathing apparatus 100. Connecting first edge 21 with second edge 22 with connector 40 may occur after pole 110 has been surrounded by covering member 10. Alternately, the connection may occur before pole 110 has been encircled by covering member 10. In this case, covering member 10 may be slid over the top of pole 110, thereby surrounding pole 110.

Connector 40 may be applied to attach first edge 21 and second edge 22 so that covering member 10 surrounds at least a portion or length of pole 110 when removable sheathing apparatus 100 is attached to pole 110. Alternately, when connector 40 attaches first edge 21 and second edge 22, pole 110 may still be outside the enclosed, covering member. In this embodiment, when removable sheathing apparatus 100 is attached to pole 110, it may hang to the side of pole 110, resembling a windsock.

Connector 40 may be connected after covering member 10 surrounds pole 110. Alternately, connector 40 may be connected before covering member 10 surrounds pole 110, and then covering member 10 may be pulled over the top of pole 110 in order to then cover pole 110.

Figure 5:
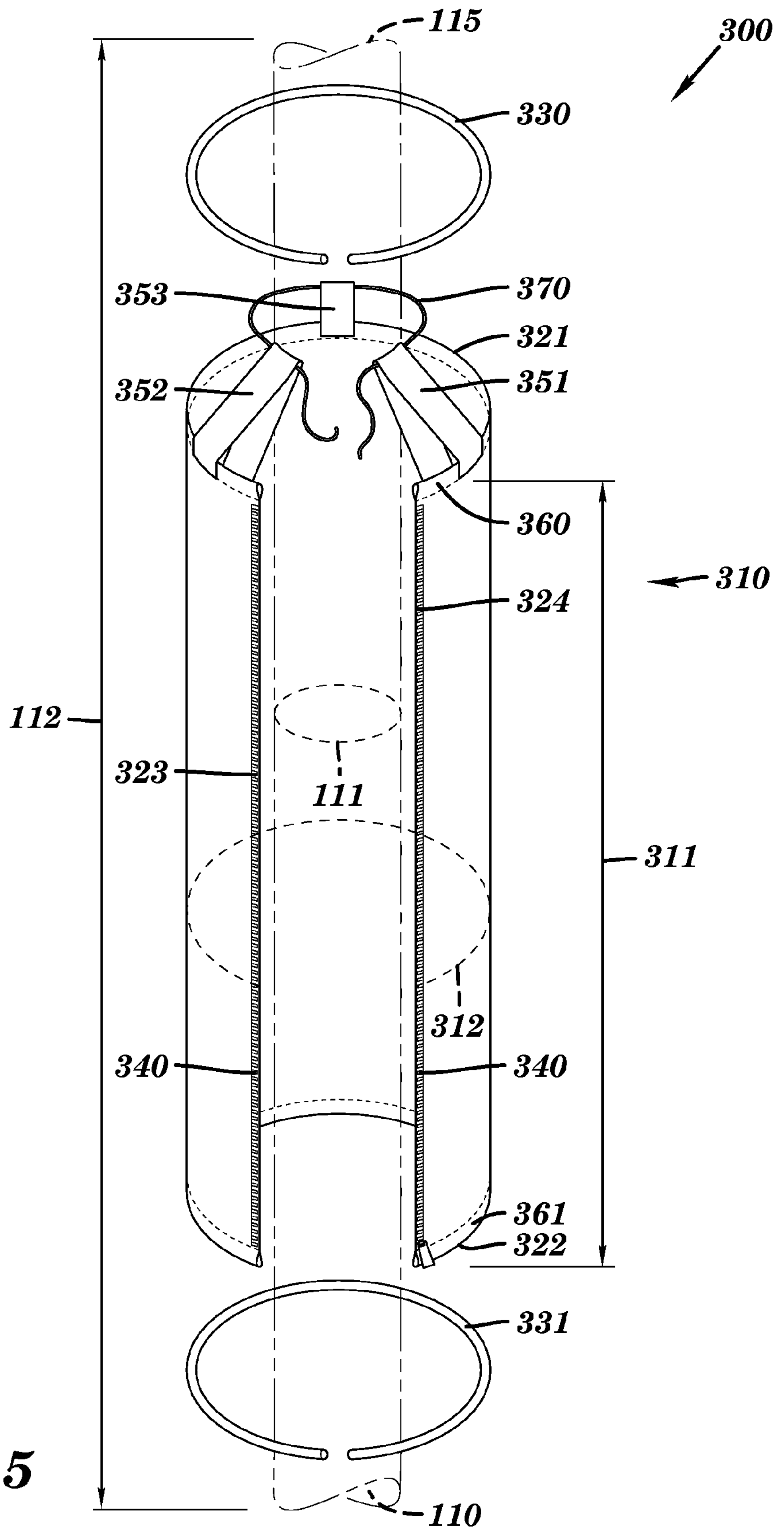
FIG. 5 shows an exploded perspective view of one of the embodiments of the present invention.

A shape retaining member 30, 31 may be configured to associate to a third or fourth edge 23, 24 of a covering member 10. Association may be facilitated by a feature 60, 61 such as a hemmed fold, as depicted in FIG. 5. In this embodiment, a first shape retaining member 30 may be inserted into a hemmed fold 60 in a third edge 23, or top edge 23, of a covering member 10, and configured to maintain the top edge 23 of the covering member 110 in a spaced apart position when the removable sheathing apparatus 100 is attached to the pole or column 110. Likewise, in this embodiment, a second shape retaining member 31 may be inserted into a hemmed fold 61 in a fourth edge 24, or bottom edge 24, of a covering member 10, and configured to maintain the bottom edge 24 of the covering member 110 in a spaced apart position when the removable sheathing apparatus 100 is attached to the pole or column 110. A shape retaining member 30, 31 may be circular in shape, or it may be any other polygonal, curved, or freeform shape. A shape retaining member 30, 31 need not be a completely enclosed shape, but instead may be opened, for example, like a semi circle. After being attached to a third or fourth edge 23, 24, a shape retaining member 30, 31 may allow covering member 10 to take the shape of a shape retaining member 30, 31. A first shape retaining member 30 need not be the same size or shape as a second shape retaining member 31. Thus, the covering member 10 may be configured to surround a length of the column 110 such that the entire perimeter of the covering member 10 is in a spaced apart position that is spaced apart from the column 110 and there is an air space 277 about the entire circumference of the column 110 between the column 110 and the covering member 10.

The embodiment depicted in FIG. 1 illustrates that a removable sheathing apparatus 100 may be generally cylindrical in shape when connector 40 attaches first edge 21 to second edge 22. Additionally, the circumference of the generally cylindrical shape may be greater than the circumference of pole 110 so that connector 40 may be applied to attach first edge 21 and second edge 22 when covering member 10 surrounds pole 110. This difference in circumference may allow a removable sheathing apparatus 100 to stand out from pole 110 which may catch the eye of a passerby and be generally aesthetically pleasing.

Figure 2:
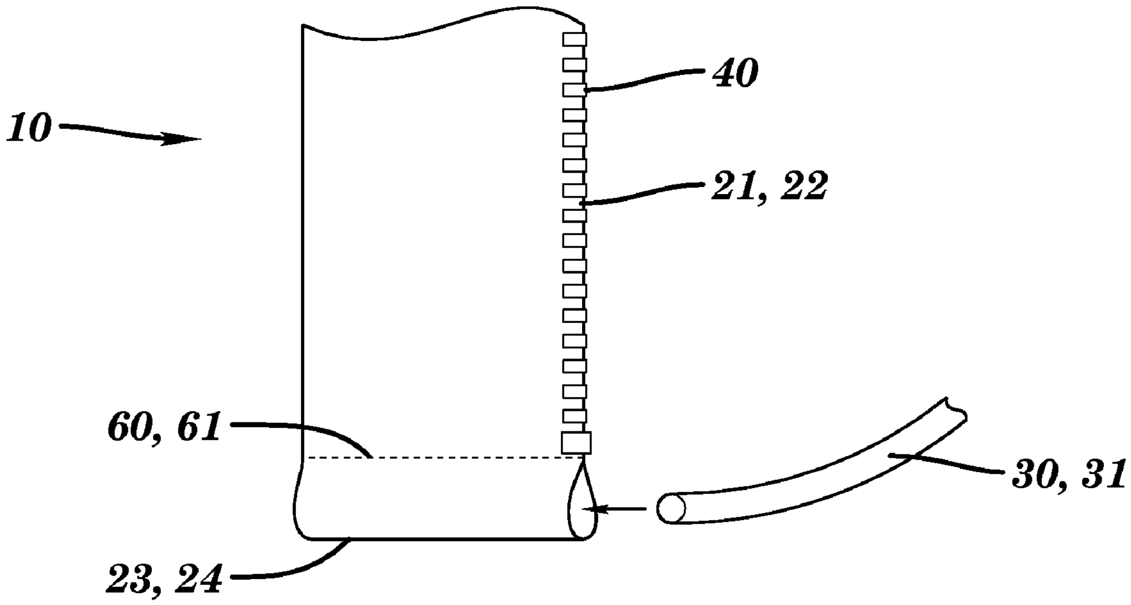
FIG. 2 shows an enlarged partial section view of assembling the shape retaining member in accordance with one of the embodiments of the present invention.

A covering member 10 may include a feature 60, 61 at an edge 23, 24, which may be configured to facilitate an association with a shape retaining member 30, 31. A feature 60, 61 may be hemmed folds, brackets, clips, clamps, bolts, screws, or any other like feature. In one embodiment, a first shape retaining member 30 may be attached to a third edge 23 of covering member 10 by, for example, being inserted into a first hemmed fold 60 in third edge 23, as shown in FIG. 2. First shape retaining member 30 may be generally circular in shape, but may also be any other polygonal or curved shape. First shape retaining member 30 need not be a completely enclosed shape, but may be opened like, for example, a semi circle or a circle with a small missing section. First shape retaining member 30 may also be an un-curved pole before being inserted into first hemmed fold 60 and may instead be bent and then held in a circular, curved or polygonal shape when connected with a connector 40. First hemmed fold 60 may be sewn, stapled, or adhered in any other feasible way to covering member 10. First shape retaining member 30 may allow covering member 10 to retain a fully expanded cylindrical shape, keeping covering member 10 open, when connector 40 attaches first edge 21 to second edge 22. First shape retaining member 30 may be a pole, rod, shaft, strip, strap, or hoop, and may be made of plastic, metal, a composite, wood, cardboard, canvas, stiff fabric, or any other material that would allow a covering member 10 to maintain its shape when connector 40 connects first edge 21 and second edge 22. Further, the first shape retaining member 30 may be an integral member, a plurality of members, or a collapsible member.

Additionally, a second shape retaining member 31 may be attached to a fourth edge 24 of covering member 10. In one embodiment, a second shape retaining member 31 may be attached to fourth edge 24 by being inserted into a second hemmed fold 61 in fourth edge 24, as shown in FIG. 2. Second hemmed fold 61 may be sewn, stapled, glued, snapped, buttoned, or adhered in any other feasible way to covering member 10. Second shape retaining member 31 may be generally circular in shape, but may also be any other polygonal or curved shape that is appropriate. Second shape retaining member 31 may not be a completely enclosed shape, but instead may be opened, for example, like a semi circle or a circle with a small missing section. Second shape retaining member 31 need not be a circular, curved or polygonal shape before being inserted into second hemmed fold 61 and may instead be an un-curved pole that is bent and then held in a circular, curved or polygonal shape when connector 40 is attached. Second shape retaining member 31 may also help to allow covering member 10 to retain a fully expanded shape, keeping covering member 10 open, when connector 40 attaches first edge 21 to second edge 22. Second shape retaining member 31 may be a pole, rod, shaft, strip, strap, or hoop, and may be made of plastic, metal, a composite, wood, cardboard, canvas, stiff fabric, or any other material that would allow a covering member 10 to maintain its shape when connector 40 connects first edge 21 and second edge 22. Further, the second shape retaining member 31 may be an integral member, a plurality of members, or a collapsible member.

In one embodiment, third edge 23 may have a substantially similar length as fourth edge 24. In this embodiment, covering member 10 may be substantially cylindrical, after first edge 21 and second edge 22 are attached by connector 40. Alternately, third edge 23 may have a greater or lesser length than fourth edge 24. In this embodiment, covering member 10 may have a tapered shape after first edge 21 and second edge 22 is attached by connector 40.

A support member 51, 52 may extend away from a third edge 23 of a covering member 10. A support member 51, 52 may be a strap, string, bar, hook, chain, cable, plate, beam, or any other type of support. A support member 51, 52 may be made of fabric, nylon, plastic, metal, or any other material that may function in supporting a sheathing apparatus 100. Additionally, support members 51, 52 may be colored or decorated to compliment a display 11 on a covering member 10. A support member may be a single component or a plurality of components. For example, the embodiment shown in FIG. 1 illustrates that a plurality of support members 51, 52 may be straps extending from a third edge 23 of covering member 10. As shown in FIG. 1, both ends of each support member 51, 52 may be attached to a third edge 23 on or around a hemmed fold 60 thereby forming a loop. Alternatively, each support member 51, 52 may extend through an opening beneath a third edge 23 in a covering member 10.

Furthermore, only one end of each support member 51, 52 may be attached to third edge 23. In this embodiment, support members 51, 52 may be folded back on themselves and attached, thereby forming loops. Support members 51, 52 may be attached by a stitching, staples, glue, weld, bolt, screw, crimp, tie, button, hook-and-loop fastener, zipper, thread, adhesive, or any other attachment means.

At least one support member 51, 52 may be secured to pole 110 by a securing member 70. A securing member 70 may be configured to secure a support member 51, 52 to a pole 110. A securing member 70 may be a strap, cord, bolt, screw, hook, clamp, or any other securing means. For example, the embodiment shown in FIG. 1 illustrates that a securing member 70 may be a tie cord such as a plastic strap, hook-and-loop strap, string, adjustable cord, or any other type of strap or cord. In this embodiment, a securing member 70 may be inserted through each support member 51, 52 and then tied to pole 110. In another example, a first end of at least one support member 51, 52 may be first attached to third edge 23 by stitching, staples, button or another adhesive. At least one support member 51, 52 may then be wrapped around or tied to pole 110. Then, a second end of at least one support member 51, 52 may be then attached by stitching, staples, button or another adhesive, to hemmed fold 60 across from where first end is attached. Furthermore, removable sheathing apparatus 100 may also include a securing member 70 attached to the at least one support member 51, 52. A securing member 70 may secure removable sheathing apparatus 100 to pole 110. A securing member 70 may be inserted through the loop formed by each of at least one support member 51, 52 and then tied to pole 110 in order to secure removable sheathing apparatus 100, as shown in FIG. 1.

Figure 3:
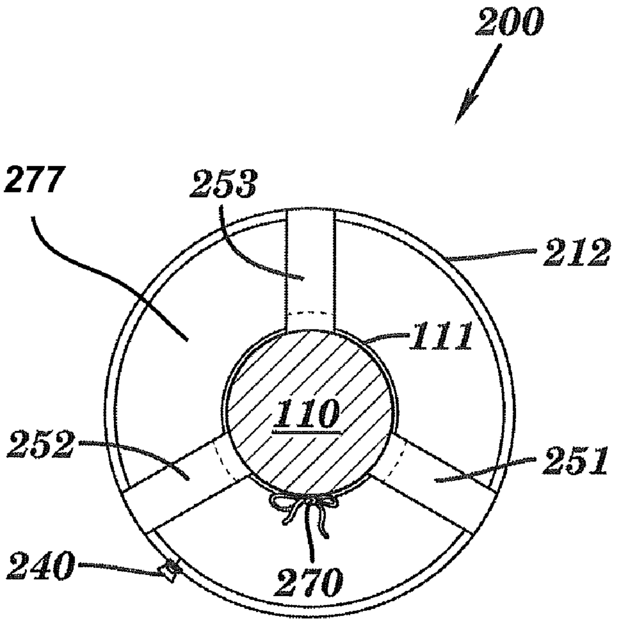
FIG. 3 shows a top view of one of the embodiments of the present invention attached to a pole.
Figure 4:
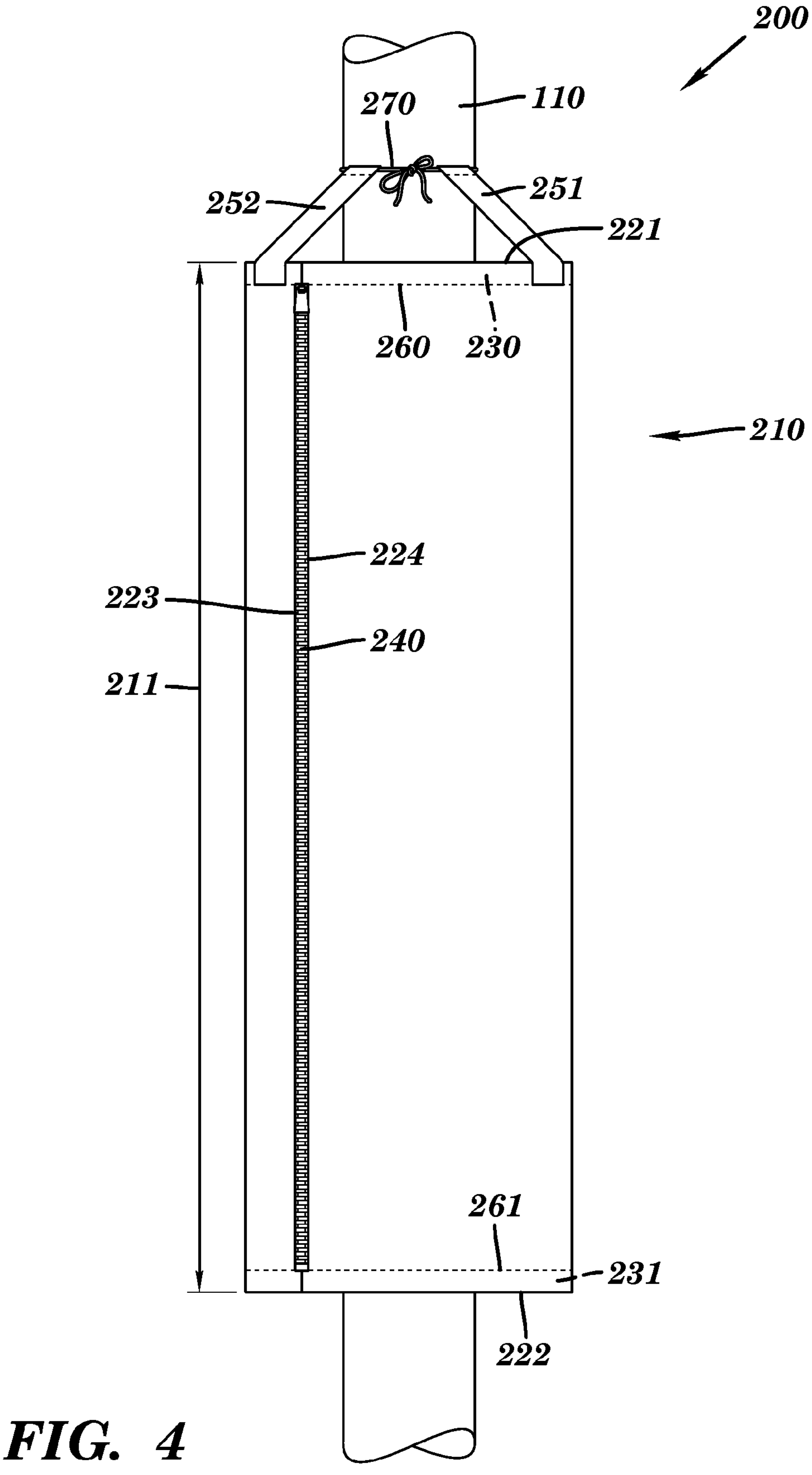
FIG. 4 shows a front plan view of one of the embodiments of the present invention in operation.

Referring to FIG. 3 and FIG. 4, and with continuing reference to FIG. 1, an embodiment of a removable sheathing apparatus 200 is shown. In one embodiment, removable sheathing apparatus 200 may have a generally cylindrical covering member 210 having a length 211 and a circumference 212. Circumference 212 may be greater than perimeter 111 of pole 110. This difference in lengths may allow a removable sheathing apparatus 200 to stand out from pole 110, catch the eye of a passerby, and be aesthetically pleasing. Covering member 210 may be made of fabric, nylon, plastic, or any other bendable or elastic material. Covering member 210 may be decorated with patriotic designs, holiday designs, advertisements, or any other aesthetically desirable displays. Pole 110 may be a column, post, tree, or anything with a length and a perimeter or circumference that may accommodate a removable sheathing apparatus 200.

A covering member 210 may include a feature 260, 261 at an edge 23, 24, which may be configured to facilitate an association with a shape retaining member 230, 231. A feature 260, 261 may be hemmed folds, brackets, clips, clamps, bolts, screws, or any other like feature. A first shape retaining member 230 may be connected to a third edge 221, or top edge, of covering member 210. First shape retaining member 230 may be attached to third edge 221 by being inserted into a first hemmed fold 260 in third edge 221. First hemmed fold 260 may be sewn, stapled, or adhered in any other feasible way to covering member 210. First shape retaining member 230 may be generally circular in shape, but may also be any other polygonal or curved shape that is appropriate. First shape retaining member 230 may not be a completely enclosed shape, but instead may be opened, for example, like a semi circle, or a circle with a small missing section. First shape retaining member 230 need not be a circular, curved or polygonal shape before being inserted into first hemmed fold 260 and may instead be bent and then held in a circular, curved or polygonal shape when connector 240 is attached. First shape retaining member 230 may maintain covering member 210 in its fully expanded shape by keeping covering member 210 opened. Additionally, first shape retaining member 230 may be a pole, rod, shaft or hoop, and may be made of plastic, metal, a composite material, or any other material with enough rigidity for covering member 210 to maintain its shape. Particularly, the first shape retaining member 230 may have at least enough rigidity to maintain the top edge 221 of the covering member 210 in the spaced apart position from the column 110 when the removable sheathing apparatus 200 is attached to the column 110.

A support member 251, 252, 253 may extend away from a third edge 221 of a covering member 210. A support member 251, 252, 253 may be a strap, string, bar, hook, chain, cable, plate, beam, or any other type of support. A support member 251, 252, 253 may be made of fabric, nylon, plastic, metal, or any other material that may function in supporting a sheathing apparatus 200. Additionally, support members 251, 252, 253 may be colored or decorated to compliment a display 11 on a covering member 210. A support member may be a single component or a plurality of components. For example, the embodiment shown in FIG. 4 illustrates that a plurality of support members 251, 252, 253 may be straps extending from a third edge 221 of covering member 210. As shown in FIG. 4, both ends of each support member 251, 252, 253 may be attached to a third edge 221 on or around a hemmed fold 260 thereby forming a loop. Alternatively, each support member 251, 252, 253 may extend through an opening beneath a third edge 221 in a covering member 210. Furthermore, only one end of each support member 251, 252, 253 may be attached to third edge 221. In this embodiment, support members 251, 252, 253 may be folded back on themselves and attached, thereby forming loops. Support members 251, 252, 253 may be attached by a stitching, staples, glue, weld, bolt, screw, crimp, tie, button, hook-and-loop fastener, zipper, thread, adhesive, or any other attachment means.

A second shape retaining member 231 may be connected to a fourth edge 222 of covering member 210. Second shape retaining member 231 may be attached to a fourth edge 222 or bottom edge, by being inserted into a second hemmed fold 261 in a fourth edge 222. Second hemmed fold 261 may be sewn, stapled, or adhered in any other feasible way to covering member 210. Second shape retaining member 231 may be generally circular in shape, but may also be any other polygonal or curved shape that is appropriate. Second shape retaining member 231 may not be a completely enclosed shape, but instead may be opened, for example, like a semi circle, or a circle with a small missing section. Second shape retaining member 231 may help keep covering member 210 fully expanded in its shape by keeping covering member 210 opened. Additionally, second shape retaining member 231 may be a pole, rod, shaft or hoop, and may be made of plastic, metal, a composite material, or any other material with enough rigidity for covering member 210 to maintain a its desired shape. Particularly, the second shape retaining member 231 may have at least enough rigidity to maintain the bottom edge 222 of the covering member 210 in the spaced apart position when the removable sheathing apparatus 200 is attached to the column 110.

In one embodiment, third edge 221 may have a substantially similar length as fourth edge 222. In this embodiment, covering member 210 may be substantially cylindrical. Alternately, third edge 221 may have a greater or lesser length than fourth edge 222. In this embodiment, covering member 210 may have a tapered shape.

Furthermore, removable sheathing apparatus 200 may further comprise a connector 240 to fasten together lengthwise covering member 210. Connector 240 may work in conjunction with first and second shape retaining members 230, 231 in order to define the shape of removable sheathing apparatus 200 with a length 211 and a circumference 212. Connector 240 may be a zipper, buttons, an adhesive, a tie-cord, or any other similar attachment means. The zipper may run the length 211 of covering member 210. Buttons or a tie cord may also be applied intermittently across length 211 to fasten removable sheathing apparatus 200 into its shape. Connector 240 may run lengthwise along covering member 210 and may be applied to attach first edge 223 and second edge 224. When connector 240 attaches first edge 223 and second edge 224, covering member 210 may be configured to surround at least a portion of pole 110.

Removable sheathing apparatus 200 may further comprise a securing member 270 attached to the support member 251, 252, 253 such that the securing member 270 is located above the top edge 221 of the covering member 210 when the securing member 270 is gripping the column or pole 110. In other words, the top edge 221 of the covering member 210 is shown hanging below the securing member 270 when the securing member 270 is gripping the pole or column 110. Securing member 270 may secure removable sheathing apparatus 200 to pole 110. A securing member 270 may be a strap, cord, bolt, screw, hook, clamp, or any other securing means. For example, the embodiment shown in FIG. 4 illustrates that a securing member 270 may be a tie cord such as a plastic strap, hook-and-loop strap, string, adjustable cord, or any other type of strap or cord. In this embodiment, a securing member 270 may be inserted through the loop of each of support member 251, 252, 253 and then tied to pole 110 in order to secure removable sheathing apparatus 200 to pole 110. Alternatively, securing member 270 may be strapped, fastened, buttoned, or adhered to pole 110. The securing member 270 may be configured to surround and grip the column or pole 110 and have a perimeter of a length that is less than the perimeter of the covering member 210.

A method of sheathing a pole is now described with reference to FIG. 5 and with continued reference to FIG. 1. One methodological step of sheathing a pole may be to provide a pole 110. A provided pole 110 may comprise a pole length dimension 112 and a pole perimeter dimension 111. A pole 110 may be a column, post, tree, or anything with a pole length dimension 112 and a pole perimeter dimension 111.

An additional methodological step of sheathing a pole may be to provide a removable sheathing apparatus 300. A provided removable sheathing apparatus 300 may include a covering member 310, a connector 340, at least one support member 351, 352, 353, at least one securing member 370, and a first shape retaining member 330.

A covering member 310 may have a first edge 323, a second edge 324, a third edge 321, and a fourth edge 322. A covering member 310 may have a dimension 312 provided by the shortest distance along an interior surface of a covering member 310 between a first edge 323 and a second edge 324. A covering member 310, may also have a length 311 provided by the distance along a covering member 310 between a third edge 321 and a fourth edge 322. A width dimension 312 may be greater than pole perimeter dimension 111. This may allow a covering member 310 to wrap around a pole 110. A covering member 310 may be made of fabric, nylon, plastic, polymer, metal, composite, paper, textile, cardboard, ceramic, or any other like material. A covering member 310 may include a feature 360, 361 at an edge 321, 322, which may be configured to facilitate an association with a shape retaining member 330, 331. A feature 360, 361 may be hemmed folds, brackets, clips, clamps, bolts, screws, or any other like feature. A connector 340 may be configured to removably attach a first edge 323 with a second edge 324 of a covering member 310. A covering member 310 may have a display 11. A display 11 may be patriotic designs, holiday designs, advertisements, patterns, artwork, colorful prints, static images, dynamic images, movies, videos, electronic display, projection display, plasma display, liquid crystal display, or any other display or imaging device. Additionally, width dimension 312 may be wider than pole perimeter dimension 111 so that a covering member 310 may be entirely spaced apart from a pole 110. Such spacing may provide an aesthetically pleasing appearance, allowing covering member 310 to appear larger than a pole 110 rather than wrapped tightly around it. This may also enhance the visibility of a covering member 310, and may, therefore, increase attention to a display 11, or it may provide sufficient area to accommodate a display 11.

Connector 340 may be a zipper, buttons, an adhesive, tie-cords, or any other attachment means. In the case of a zipper, the two sides may be attached to first edge 323 and second edge 324 along length 311. Buttons or a tie cord may also be applied intermittently across length 311 to attach a covering member first edge 323 with a covering member second edge 324. Connecting first edge 323 with second edge 324 with connector 340 may occur after pole 110 has been surrounded by covering member 310. Alternately, the connection may occur before pole 110 has been encircled by covering member 310. In this case, covering member 310 may be slid over the top 115 of pole 110, thereby surrounding pole 110.

A support member 351, 352, 353 may be configured to attach to a third edge 321 of a covering member 310. A support member 351, 352, 353 may be a strap, string, bar, hook, chain, cable, plate, beam, or any other type of support. A support member 351, 352, 353 may be made of fabric, nylon, plastic, metal, or any other material that may function in supporting a sheathing apparatus 300. Additionally, support members 351, 352, 353 may be colored or decorated to compliment a display 11 on a covering member 310. A support member may be a single component or a plurality of components. For example, the embodiment shown in FIG. 5 illustrates that a plurality of support members 351, 352, 353 may be straps extending from a third edge 321 of covering member 310. As shown in FIG. 5, both ends of each support member 351, 352, 353 may be attached to a third edge 321 on or around a feature 360 thereby forming a loop. Alternatively, each support member 351, 352, 353 may extend through an opening beneath a third edge 321 in a covering member 310. Furthermore, only one end of each support member 351, 352, 353 may be attached to third edge 321. In this embodiment, support members 351, 352, 353 may be folded and attached to mid-points on themselves, thereby forming loops. Support members 351, 352, 353 may be attached by a stitching, staples, glue, weld, bolt, screw, crimp, tie, button, hook-and-loop fastener, zipper, thread, adhesive, or any other attachment means.

A securing member 370 may be configured to associate a sheathing apparatus 300 to a pole 110. A securing member 370 may be a strap, cord, bolt, screw, hook, clamp, or any other securing means. For example, the embodiment shown in FIG. 5 illustrates that a securing member 370 may be a tie cord such as a plastic strap, hook-and-loop strap, string, adjustable cord, or any other type of strap or cord. In this embodiment, a securing member 370 may be inserted through each support member 351, 352, 353 and then tied to pole 110.

A shape retaining member 330, 331 may be configured to associate to a third or fourth edge 321, 322 of a covering member 310. Association may be facilitated by a feature 360, 361 such as a hemmed fold, as depicted in FIG. 5. In this embodiment, a first shape retaining member 330 may be inserted into a hemmed fold 360 in a third edge 321 of a covering member 310. Likewise, in this embodiment, a second shape retaining member 331 may be inserted into a hemmed fold 361 in a fourth edge 322 of a covering member 310. A shape retaining member 330, 331 may be circular in shape, or it may be any other polygonal, curved, or freeform shape. A shape retaining member 330, 331 need not be a completely enclosed shape, but instead may be opened, for example, like a semi circle. A shape retaining member 330, 331 may be a pole, rod, shaft, strip, strap, or hoop, and may be made of plastic, metal, a composite, wood, cardboard, canvas, stiff fabric, or any other material that would allow a covering member 310 to maintain its shape when connector 340 connects first edge 323 and second edge 324. Further, a shape retaining member 330, 331 may be an integral member, a plurality of members, or a collapsible member. After being attached to a third or fourth edge 321, 322, a shape retaining member 330, 331 may allow covering member 310 to take the shape of a shape retaining member 330, 331. A first shape retaining member 330 need not be the same size or shape as a second shape retaining member 331.

Yet another methodological step of sheathing a pole may be to surround a pole 110 with a removable sheathing apparatus 300, such that the removable sheathing apparatus 300 surrounds at least a portion of the pole 110. An additional methodological step may be to secure a removable sheathing apparatus 300 to a pole 110 with at least one securing member 370. Still further, another methodological step may be to attach a first edge 323 of a covering member to a second edge 324 of a covering member with a connector 340.

Various modifications and variations of the described apparatus and methods of the invention will be apparent to those skilled in the art without departing from the scope and spirit of the invention. Although the invention has been described in connection with specific embodiments, outlined above, it should be understood that the invention should not be unduly limited to such specific embodiments. Various changes may be made without departing from the spirit and scope of the invention as defined in the following claims.

What is claimed is:

1. A removable sheathing apparatus comprising:

a covering member having a first edge and a second edge, wherein said first edge is removably attachable to said second edge by a connector such that the covering member has a perimeter of a first length, wherein the covering member is a windsock that is configured to surround a length of a column such that the perimeter of the covering member is in a spaced apart position that is spaced apart from the column and that there is an air space about the circumference of the column between the column and the covering member;

a first shape retaining member, attached to a top edge of said covering member, the first shape retaining member having at least enough rigidity to maintain the top edge of the covering member in the spaced apart position when the removable sheathing apparatus is attached to the column;

a securing member configured to surround and grip the column and having a perimeter of a second length less than the first length; and at least one support member movably extending from a third edge of said covering member to the securing member such that the securing member is located above the top edge of the covering member when the securing member is gripping the column.

2. The removable sheathing apparatus of claim 1, wherein the securing member is configured to be tied to the column.

3. The removable sheathing apparatus of claim 1, further comprising a second shape retaining member, attached to a bottom edge of said covering member, the first shape retaining member having at least enough rigidity to maintain the bottom edge of the covering member in the spaced apart position when the removable sheathing apparatus is attached to the column.

4. The removable sheathing apparatus of claim 1, wherein the first shape retaining member is inserted into a hemmed fold.

5. The removable sheathing apparatus of claim 1, wherein the first shape retaining member is circular in shape.

6. The removable sheathing apparatus of claim 1, wherein the securing member is a mechanism selected from the group consisting of a strap, a cord, a belt, a screw, a hook, and a clamp.

7. The removable sheathing apparatus of claim 1, wherein said covering member contains a display.

8. A removable sheathing apparatus comprising:

a covering member having a perimeter of a first length and configured to surround a length of a column such that the perimeter of the covering member is in a spaced apart position from the column and that there is an air space about the circumference of the column between the column and the covering member;

an elongate first shape retaining member insertable into a top portion of the covering member and having at least enough rigidity to maintain a top edge of the covering member in the spaced apart position when the removable sheathing apparatus is attached to the column;

a securing member configured to surround and grip the column and having a perimeter of a second length that is less than the first length; and at least one support member extending from said top edge of said covering member to the securing member, wherein the support member is configured to connect to the securing member such that the top edge of the covering member hangs below the securing member when the securing member is gripping the column.

9. The removable sheathing apparatus of claim 8, further comprising an elongate second shape retaining member insertable into a bottom portion of the covering member and having at least enough rigidity to maintain a bottom edge of the covering member in the spaced apart position when the removable sheathing apparatus is attached to the column.

10. The removable sheathing apparatus of claim 8, wherein the elongate first shape retaining member is circular in shape.

11. The removable sheathing apparatus of claim 8, wherein the securing member is attached to said at least one support member, wherein said securing member is tied to the column.

12. The removable sheathing apparatus of claim 11, wherein the covering member surrounds at least a portion of said column and wherein there is at least one orientation where a generally geometric shape of said covering member does not touch said column.

13. The removable sheathing apparatus of claim 8, wherein said covering member contains a display.

* * * * *